(12) United States Patent  (10) Patent No.: US 8,020,833 B2
Sun et al.  (45) Date of Patent: Sep. 20, 2011

(54) PRESSURE GAS RELEASE VALVE FOR FIRE SUPPRESSION

(75) Inventors: Fanping Sun, Glastonbury, CT (US); Muhidin A. Lelic, Manchester, CT (US); Zaffir Chaudhry, South Glastonbury, CT (US); Tony George, Cincinnati, OH (US); Lyle Hamilton, Cincinnati, OH (US)

(73) Assignee: CHUBB International Holding Limited, Sudbury-On-Thames, Middlesex (GB)

( * ) Notice: Subject to any disclaimer, the term of this patent is extended or adjusted under 35 U.S.C. 154(b) by 591 days.

(21) Appl. No.: 12/086,961

(22) PCT Filed: Dec. 22, 2005

(86) PCT No.: PCT/US2005/047324
§ 371 (c)(1),
(2), (4) Date: Nov. 3, 2008

(87) PCT Pub. No.: WO2007/073390
PCT Pub. Date: Jun. 28, 2007

(65) Prior Publication Data
US 2009/0178811 A1  Jul. 16, 2009

(51) Int. Cl.
*F16K 21/04* (2006.01)
(52) U.S. Cl. .......... 251/28; 251/30.01; 251/144
(58) Field of Classification Search .......... 251/25, 251/28, 30.01, 50, 52, 144
See application file for complete search history.

(56) References Cited

U.S. PATENT DOCUMENTS

| | | | |
|---|---|---|---|
| 3,010,691 A * | 11/1961 | Canfield | 251/30.02 |
| 3,052,304 A | 9/1962 | Williamson et al. | |
| 3,612,476 A * | 10/1971 | Leitgeb | 251/38 |
| 3,687,160 A * | 8/1972 | Erickson et al. | 137/599.12 |
| 4,682,531 A | 7/1987 | Mayer | |
| 6,220,565 B1 * | 4/2001 | Yonezawa et al. | 251/30.04 |
| 7,669,830 B2 * | 3/2010 | Franconi | 251/30.02 |
| 7,815,162 B2 * | 10/2010 | Entwistle et al. | 251/30.02 |

OTHER PUBLICATIONS

European Search Report-Written Opinion, Jan. 27, 2010, Three Pages.
Official Search Report of the Patent Cooperation Treaty in counterpart foreign Application No. PCT/US05/47324 filed Dec. 22, 2005.

* cited by examiner

*Primary Examiner* — John Fristoe, Jr.
(74) *Attorney, Agent, or Firm* — Kinney & Lange, P.A.

(57) ABSTRACT

A two-step, self-regulating valve (16) controls gas flow from a gas cylinder (12) in a high pressure system. The valve (16) includes a valve body (24), a piston (26), a plug (28), a valve actuator (34), and a piston actuator (32). The piston (26) is movable within the valve body (24) along an axis between a first and a second position. The plug (28) is movable within the valve body (24) along the axis between a valve closed position, a partially open position, and a fully open position. The valve actuator (34) allows the plug (28) to move from the valve closed position to the partially open position. The piston actuator (32) causes the piston (26) to move from the first position to the second position when a gas pressure in the gas cylinder (12) is less than a setpoint. When the piston (26) moves to the second position, the piston (26) allows the plug (28) to move from the partially open position to the fully open position.

21 Claims, 8 Drawing Sheets

PRESSURE GAS RELEASE VALVE FOR FIRE SUPPRESSION

BACKGROUND OF THE INVENTION

Hazard suppression systems have long been employed for protecting areas containing valuable equipment or components, such as art galleries, data centers, and computer rooms. Traditionally, these systems utilize Halon, which is ideal for hazard suppression because it is capable of very quickly suppressing a hazard, it can be stored at relatively low pressures, and only a relatively small quantity is required.

However, in recent years the adverse environmental effects of Halon on the ozone have become evident, and many governmental agencies have banned further use of Halon. In some countries, existing Halon systems are being replaced by systems using more environmentally friendly inert gases such as nitrogen, argon, carbon dioxide, and mixtures thereof. Unlike the Halon-based fire suppression systems, inert gas-based systems use natural gases and do not contribute to atmospheric ozone depletion.

Combustion occurs when fuel, oxygen, and heat are present in sufficient amounts to support the ignition of flammable material. Inert gas fire suppression systems are based on reducing the level of oxygen in an enclosure to a level that will not sustain combustion. In order to extinguish a fire, inert gas stored in a large number of high-pressure cylinders is released into the enclosure to reduce the concentration of oxygen by displacing oxygen with the inert gas until combustion is extinguished. Typically, ambient air comprises 21% concentration by volume of oxygen. This concentration must be reduced to below 14% to effectively extinguish the fire. To reach this objective, a relatively large volume of gas must be released.

There are health and safety implications for facility personnel, particularly in relation to the reduction of oxygen in the atmosphere once the system is discharged. Careful calculation is required to ensure that the concentration of inert gas released is sufficient to control combustion, yet not so high as to pose a serious risk to personnel.

The replacement of Halon with inert gas for fire protection presents two issues with the system design. First, the delivery of a large amount of The replacement of Halon with inert gas for fire protection presents two issues with the system design. First, the delivery of a large amount of gas into a protected room within a short period time (fire codes in some countries require that the gas be delivered in less than one minute) may generate overpressure in the room which could potentially damage equipment in the room. Current industrial practice is to use a special, expensive vent in the room to prevent the overpressure. Second, unlike Halon, inert gas is stored under normal room temperature in gaseous form, rather than liquid form. To reduce the storage vessel volume, a very high pressure is preferred, typically around 100 bar. As a result, the gas distribution system must be capable of withstanding extremely high pressures. These two limitations are key factors in the cost of both new installation and retrofit.

The overpressure in the protected room is primarily caused by an uneven discharge of the inert gas from the pressure vessel. The pressure in the gas vessel decays exponentially during gas release, so the overpressure typically occurs in the first few seconds of the discharge. If the gas release can be throttled to a fairly uniform pressure profile over the duration of the discharge, overpressure in the protected room can be prevented while ensuring that the predetermined amount of inert gas is delivered within the required time.

Throttling the gas flow requires a valve with a controllable variable opening area. While this can be performed by a closed-loop servo valve, high initial and maintaining costs make it an unfavorable approach for fire protection. In addition, the increased system complexity of a closed-loop control can also introduce reliability concerns.

BRIEF SUMMARY OF THE INVENTION

A two-step, self-regulating valve controls gas flow in a high pressure system. The valve includes a valve body, a piston, a plug, a valve actuator, and a piston actuator. The piston is movable within the valve body along an axis between a first and a second position. The plug is movable within the valve body along the axis between a valve closed position, a partially open position, and a fully open position. The valve actuator allows the plug to move from the valve closed position to the partially open position. The piston actuator causes the piston to move from the first position to the second position when a gas pressure in the gas cylinder is less than a setpoint. When the piston moves to the second position, the piston allows the plug to move from the partially open position to the fully open position.

DETAILED DESCRIPTION

Figure 1:
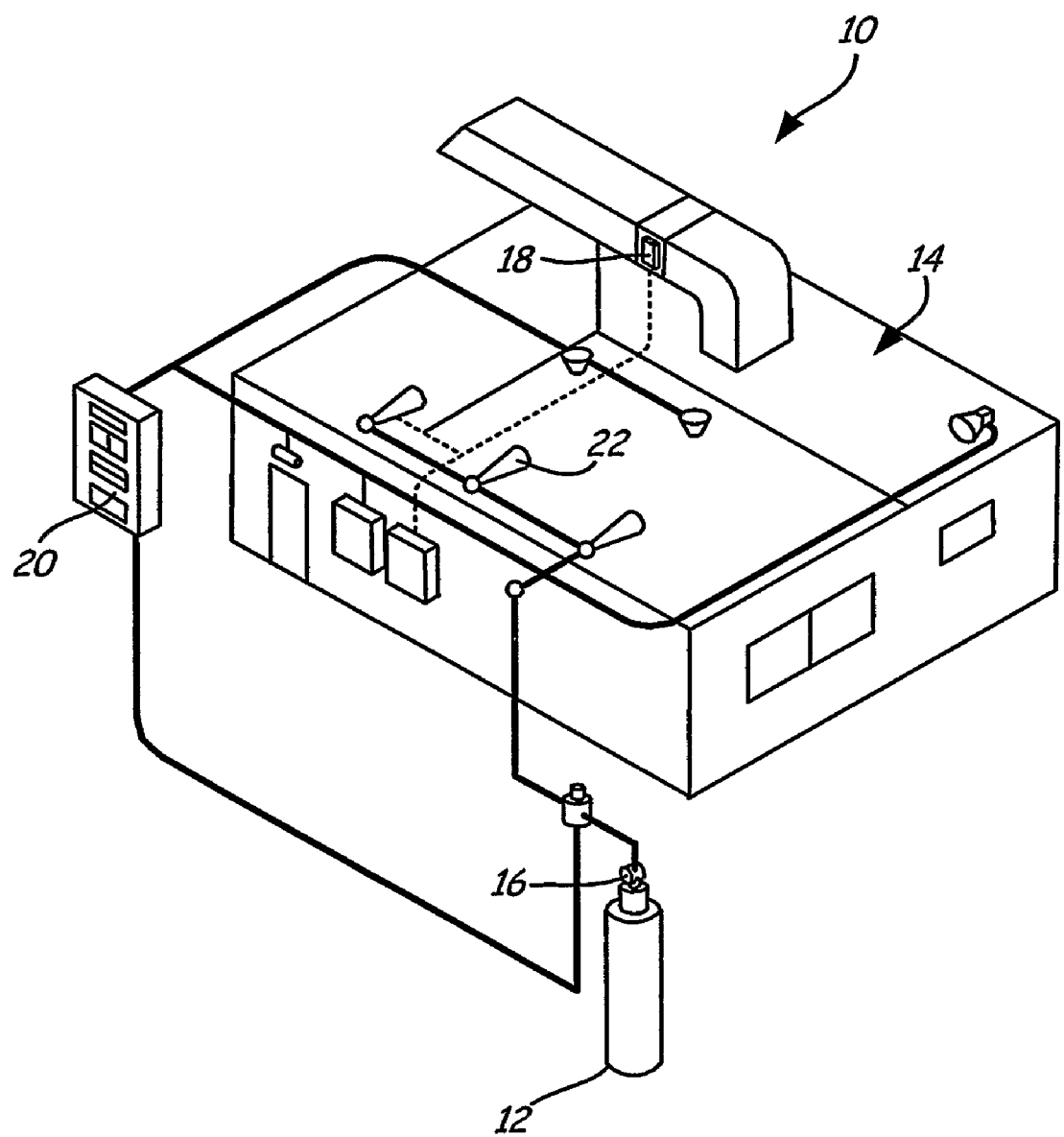
FIG. 1 is a schematic representation of a fire suppression system in accordance with the present invention.

FIG. 1 is a schematic representation of an inert gas-based fire suppression system 10. An plurality of inert gas storage cylinder 12 is located in a storage area or room proximate an enclosed room 14 to be protected. Inert gas storage cylinder 12 contains inert gas to be released into protected room 14 in case of a fire. Associated with cylinder 12 is a two-step opening high pressure self-regulating valve 16 for controllably releasing gas into protected room 14. When a fire is detected in protected room 14 by a fire detector 18 located in protected room 14, a control panel 20 opens self-regulating valve 16. Gas is then discharged into protected room 14 through discharge nozzles 22 to deplete the concentration of oxygen in protected room 14 and extinguish the fire.

Figure 2:
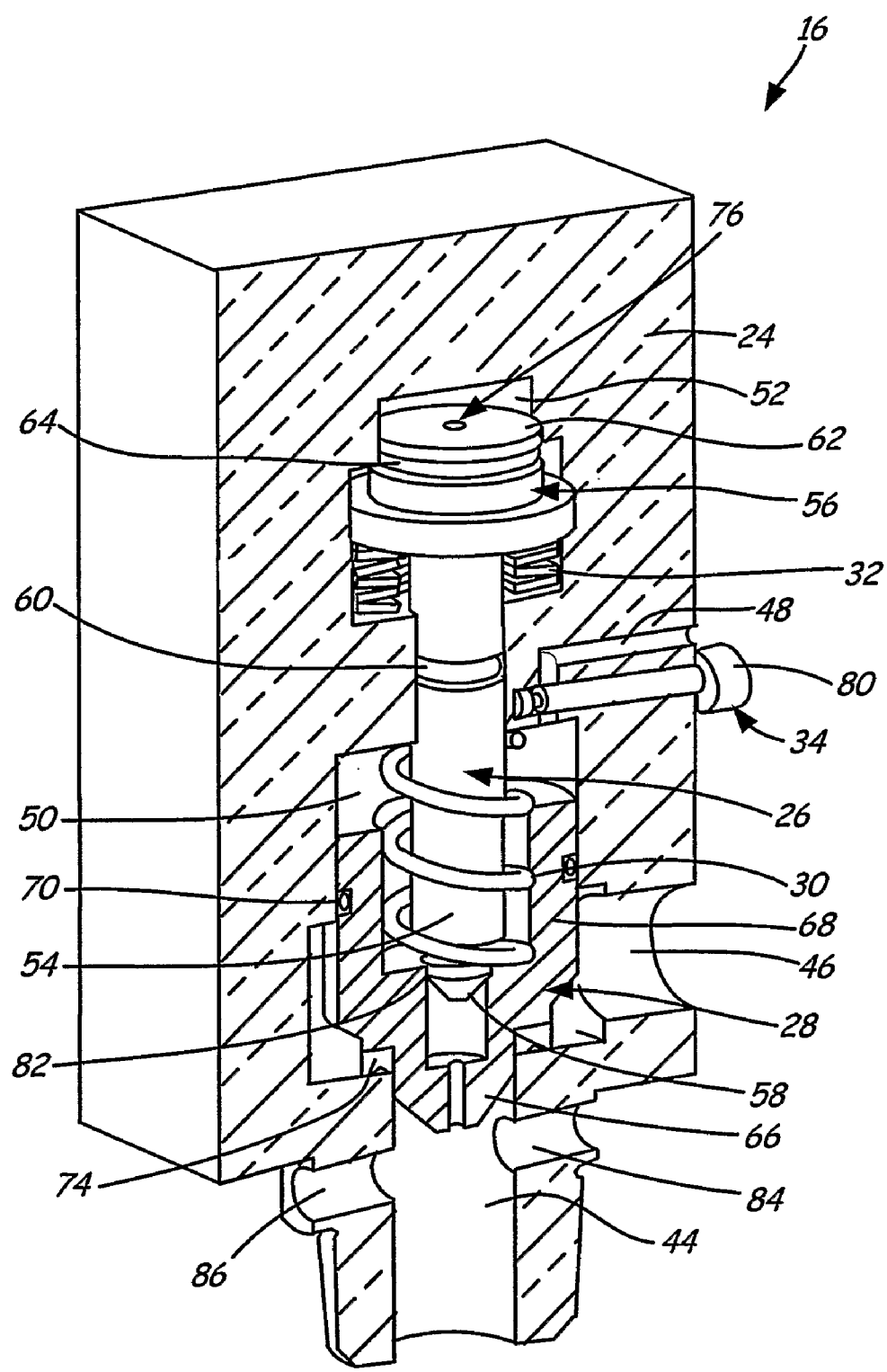
FIG. 2 is a perspective view of the fire suppression system in accordance with the present invention.
Figure 3:
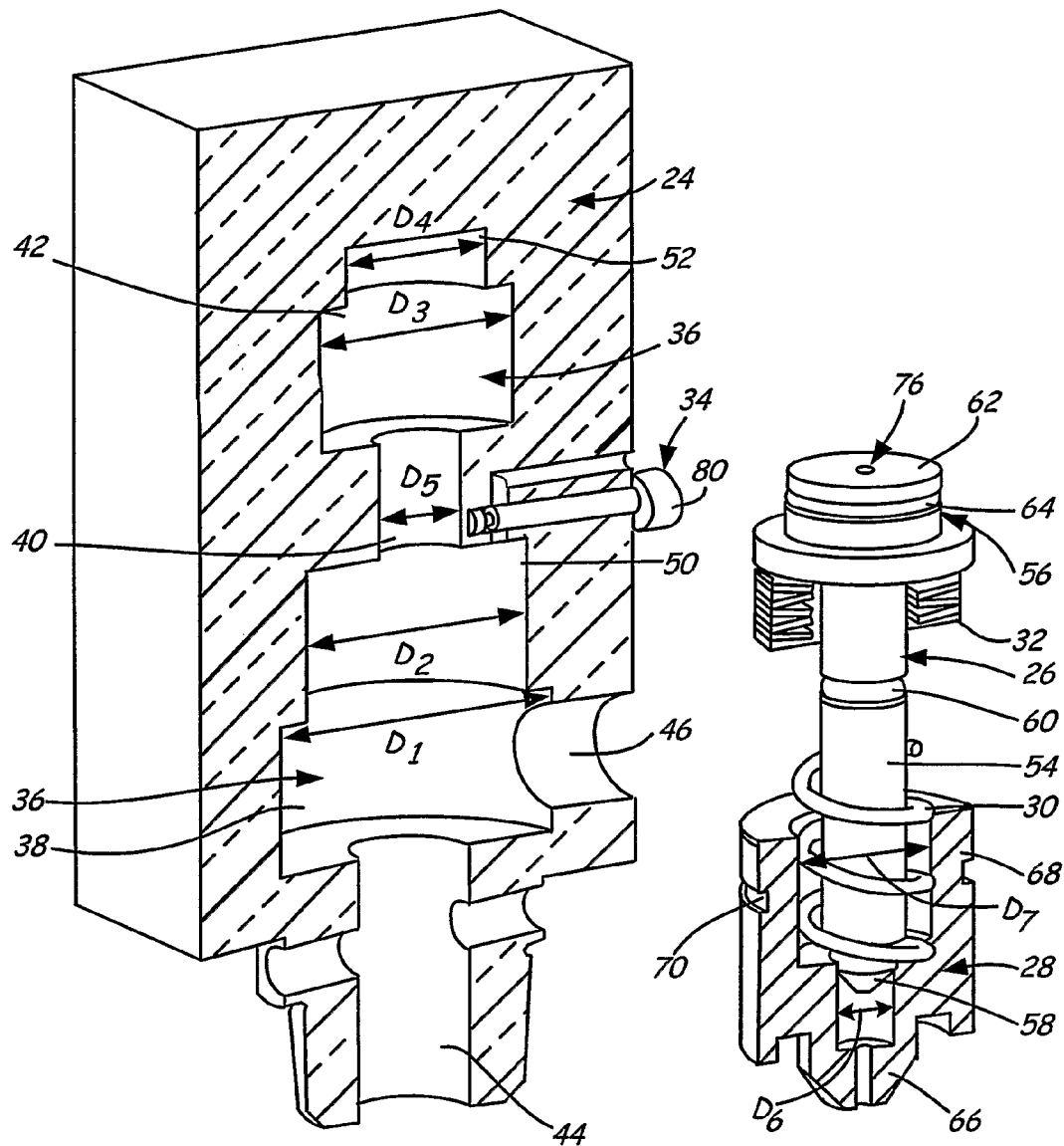
FIG. 3 is a partially exploded perspective view of the fire suppression system in accordance with the present invention.

FIGS. 2 and 3 show a cut-away perspective view and a partially exploded perspective view of regulating valve 16, respectively, and will be discussed in conjunction with one another. Various portions of FIGS. 2 and 3 are shown in light lines to help with the visualization of self-regulating valve 16.

Self-regulating valve 16 generally includes valve body 24, piston 26, plug 28, hold down spring 30, Belleville spring 32, and slidable spool 34. Self-regulating valve 16 throttles the release of inert gas from cylinder 12 in order to control the pressure discharge into protected room 14.

Valve body 24 has lower section 24A, middle section 24B, and upper section 24C and generally includes interior cavity 36, gas inlet 44, gas outlet 46, bleed passage 48, charging port 84, and pressure monitoring port 86. Interior cavity 36 includes plug chamber 38, intermediate section 40, and piston chamber 42. Plug chamber 38 of interior cavity 36 is located in lower section 24A and the lower portion of middle section 24B of valve body 24 and has a first diameter $D_1$ and a second diameter $D_2$ smaller than first diameter $D_1$. Piston chamber 42 of interior cavity 36 is located in upper section 24C of valve body 24 and has a first diameter $D_3$ and a second diameter $D_4$ smaller than first diameter $D_3$. Intermediate section 40 of interior cavity 36 is located in middle section 24B of valve body 24 between plug and piston chambers 38 and 42 and has a diameter $D_5$ smaller than diameters $D_1$, $D_2$, $D_3$, and $D_4$ of plug and piston chambers 38 and 42. Piston 26 is housed within lower section 24A, middle section 24B, and upper section 24C of valve body 24 and is slidable between a closed position and an open position. Piston 26 in piston chamber 42 forms control chamber 52 in upper section 24C of valve body 24. Plug 28 is housed in lower and middle sections 24A and 24B of valve body 24 and is slidable between a closed position, a partially open position, and an open position. Plug 28 in plug chamber 38 forms bias chamber 50 in middle section 24B of valve body 24 between plug 28 and intermediate section 40 of interior cavity 36. Although valve body 24 is depicted in the figures as being formed from a single piece of material, valve body 24 can be formed from a number of sections that are joined together by methods known by those skilled in the art.

Bias chamber 50 is located between plug 28 and intermediate section 40 of interior cavity 36 and is connected to the atmosphere by bleed passage 48. Hold down spring 30 is located in bias chamber 50 between plug 28 and intermediate section 40 of interior cavity 36 and is positioned around piston 26. The gas in bias chamber 50 and hold down spring 30 apply pressure to plug 28 and maintain plug 28 in the closed position so that gas cannot pass from gas cylinder 12 to protected room 14. When piston 26 and plug 28 are in the closed position, bias chamber 50 is in communication with gas inlet 44 and has a gas pressure equal to gas cylinder 12.

Control chamber 52 is located between piston 26 and piston chamber 42 of interior cavity 36 and has a diameter $D_4$ equal to second diameter $D_4$ of piston chamber 42 of interior cavity 36. Belleville spring 32 is located in piston chamber 42 of interior cavity 36 between intermediate section 40 of interior cavity 36 and piston 26. When self-regulating valve 16 is closed, the pressure in control chamber 52, which is equal to the pressure in cylinder 12, acts on piston 26 and overcomes the spring force of Belleville spring 32 and maintains piston 26 in the closed position.

Piston 26 has a rod section 54 housed in plug chamber 38 and intermediate section 40 of interior cavity 36 and a head section 56 housed in piston chamber 42 of interior cavity 36. Rod section 54 of piston 26 has a diameter $D_5$ sized to engage intermediate section 40 of interior cavity 36 and includes end portion 58 having a diameter $D_6$ smaller than diameter $D_5$ of rod section 54. O-ring 60 is positioned around rod section 54 of piston 26 to ensure that gas does not pass through intermediate section 40 of interior cavity 36. Head section 56 of piston 26 has a diameter $D_3$ sized to engage piston chamber 42 of interior cavity 36 and includes end portion 62 having diameter $D_4$ smaller than diameter $D_3$ of head section 56. Piston 26 is slidable within interior cavity 36 between a closed position and an open position. When piston 26 is in the closed position, Belleville spring 32 is fully compressed and head section 56 of piston 26 is positioned proximate intermediate section 40 of interior cavity 36. When piston 26 is in the open position, head section 56 of piston 26 is proximate piston chamber 42 of interior cavity 36. O-ring 64 is positioned around head section 56 of piston 26 and maintains a seal around head section 56 such that gas cannot enter piston chamber 42 from control chamber 52.

Plug 28 is housed in plug chamber 38 of interior cavity 36 and has a control contour end 66 and a main section 68. Plug 28 is contoured such control contour end 66 of plug 28 is sized to engage gas inlet 44 and main section 68 of plug 28 is sized to engage plug chamber 38 of interior cavity 36. O-ring 70 around main section 68 of plug 28 prevents gas from entering plug chamber 38 from bias chamber 50. Plug 28 has two inner diameters, first diameter $D_6$ and second diameter $D_7$. First inner diameter $D_6$ of plug 28 is sized to engage end portion 58 of rod section 54 of piston 26. Second inner diameter $D_7$ of plug 28 is sized to engage rod section 54 of piston 26 and hold down spring 30 encompassing rod section 54 of piston 26. Plug 28 is movable between a closed position, a partially open position, and an open position. Plug 28 is in the closed position when control contour end 66 of plug 28 is engaging gas inlet 44 of interior cavity 36. Plug 28 is in the partially open position when inner diameters $D_6$ and $D_7$ of plug 28 are fully engaging piston 26. Plug 28 is in the fully open position when main section 68 of plug 28 abuts interior cavity 36 where plug chamber 38 of interior cavity 36 and intermediate section 40 of interior cavity 36 join together. When plug 28 is in the closed position, control contour end 66 of plug 28 sits in gas inlet 44, blocking primary passage 72 (shown in FIGS. 5 and 6) connecting gas inlet 44 and gas outlet 46. A soft seal 74 encompasses control contour end 66 of plug 28 and provides a secure seal between gas inlet 44 and plug chamber 38 of interior cavity 36 where plug 28 engages gas inlet 44 to ensure that gas is not allowed to flow from gas inlet 44 to gas outlet 46.

A flow passage 76 extends through interior cavity 36 from gas inlet 44 to control chamber 52. Flow passage 76 passes through plug 28 and piston 26 and allows gas in gas cylinder 12 to be in communication with bias chamber 50 and control chamber 52. In the closed position, plug 28 is disengaged from piston 26, allowing gas to flow through flow passage 76 in control contour end 66 of plug 28, around end portion 58 of rod section 54 of piston 26, and into bias chamber 50. Flow passage 76 also allows gas from gas cylinder 12 to pass from gas inlet 44 through plug 28 and piston 26 to control chamber 50. Thus, when piston 26 and plug 28 are in the closed position, gas cylinder 12, bias chamber 50, and control chamber 52 have equal gas pressures.

Slidable spool 34 is engageable with bleed passage 48 and controls the flow of gas from bias chamber 50 to the atmosphere. Slidable spool 34 includes a passage 78 and is slidable between a closed position and an open position. When slidable spool 34 is in the closed position, passage 78 of slidable spool 34 is not aligned with bleed passage 48, preventing gas from leaving bias chamber 50 through bleed passage 48. When slidable spool 34 is in the open position, passage 78 of slidable spool 34 is aligned with bleed passage 48, allowing gas to leave from bias chamber 50 through bleed passage 48. In one embodiment, slidable spool 34 is a Schraeder valve.

Figure 4:
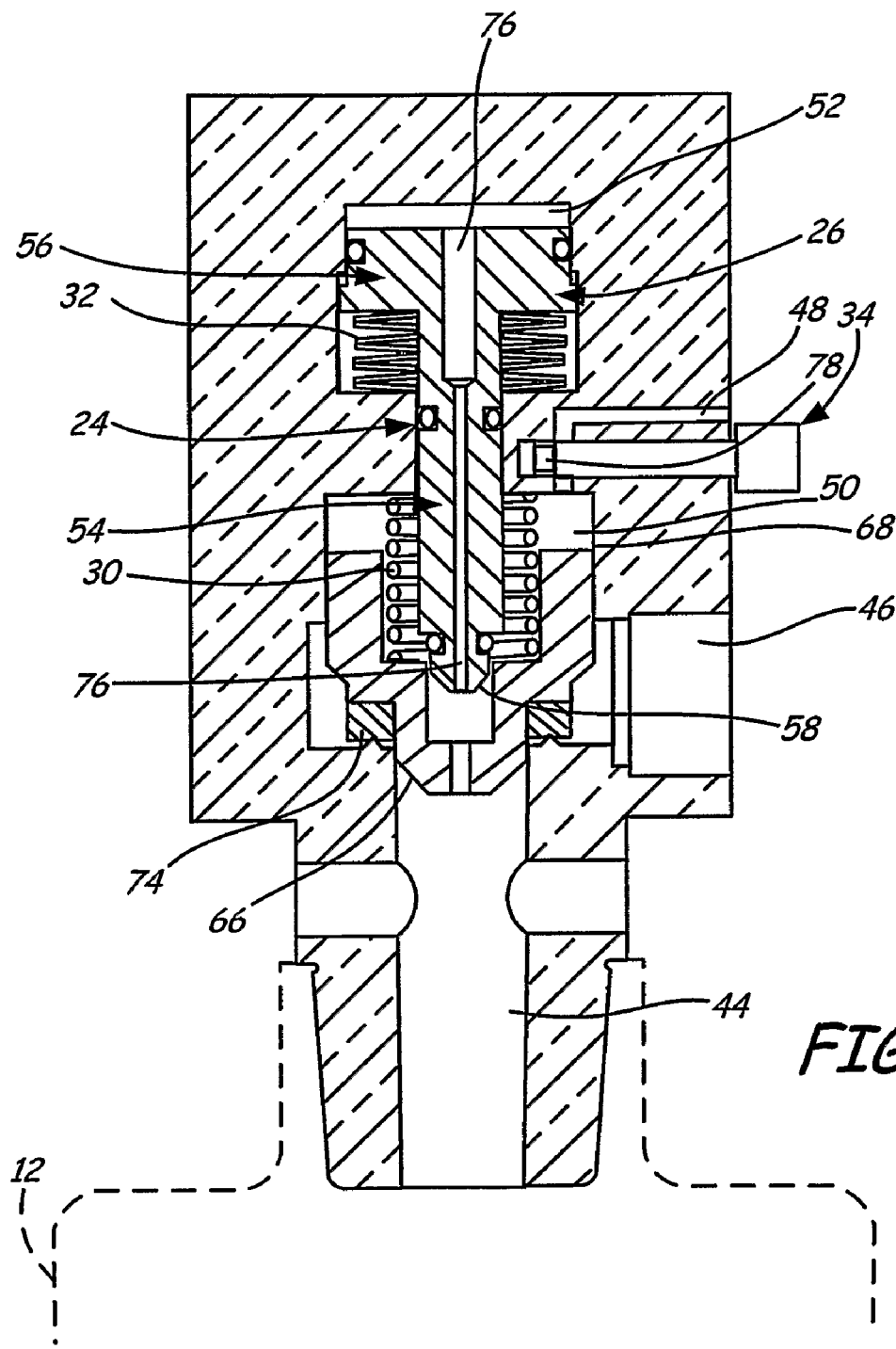
FIG. 4 is a sectional view of the fire suppression system in a fully closed position in accordance with the present invention.
Figure 5:
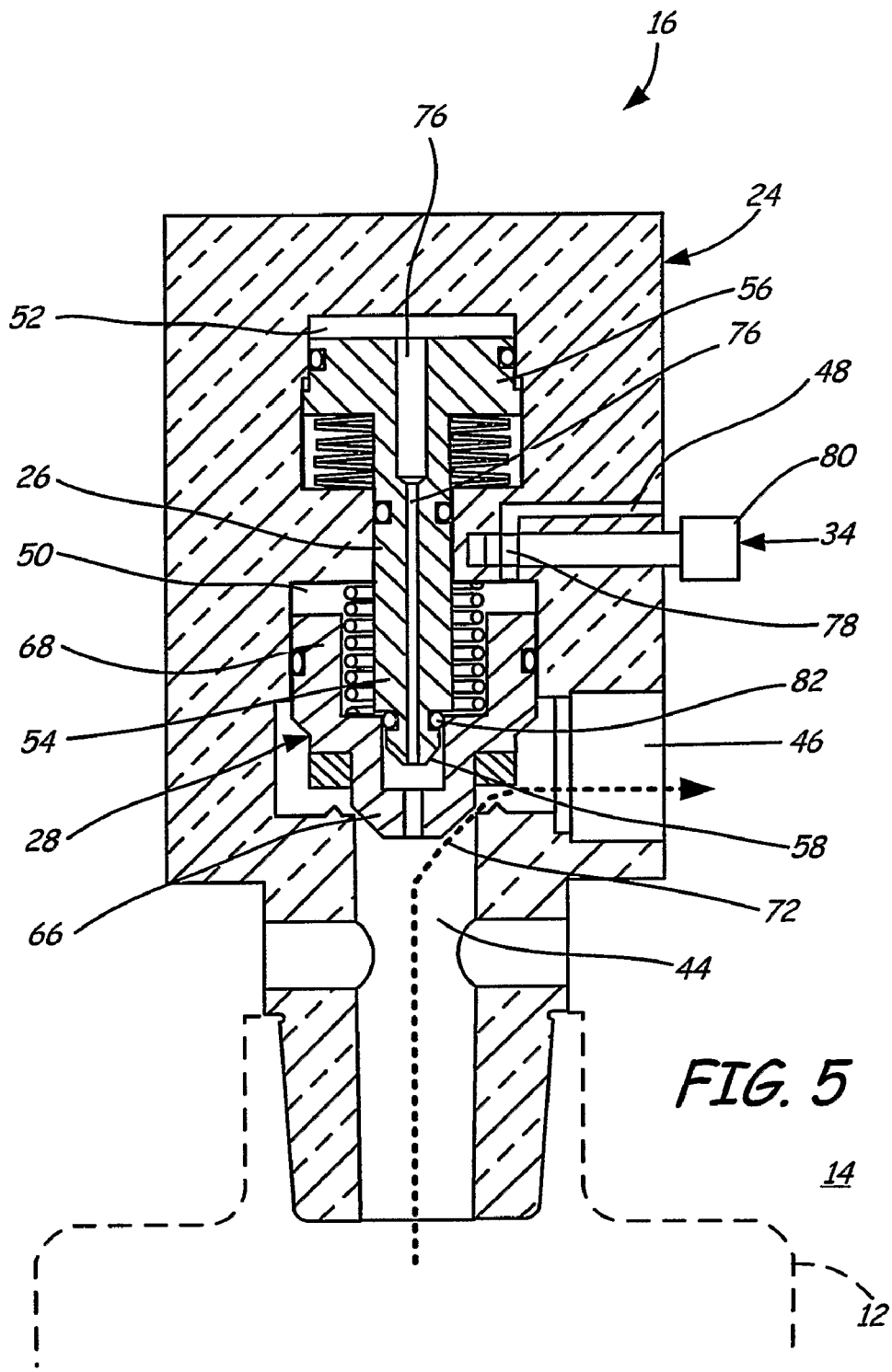
FIG. 5 is a sectional view of the fire suppression system in a partially open position in accordance with the present invention.
Figure 6:
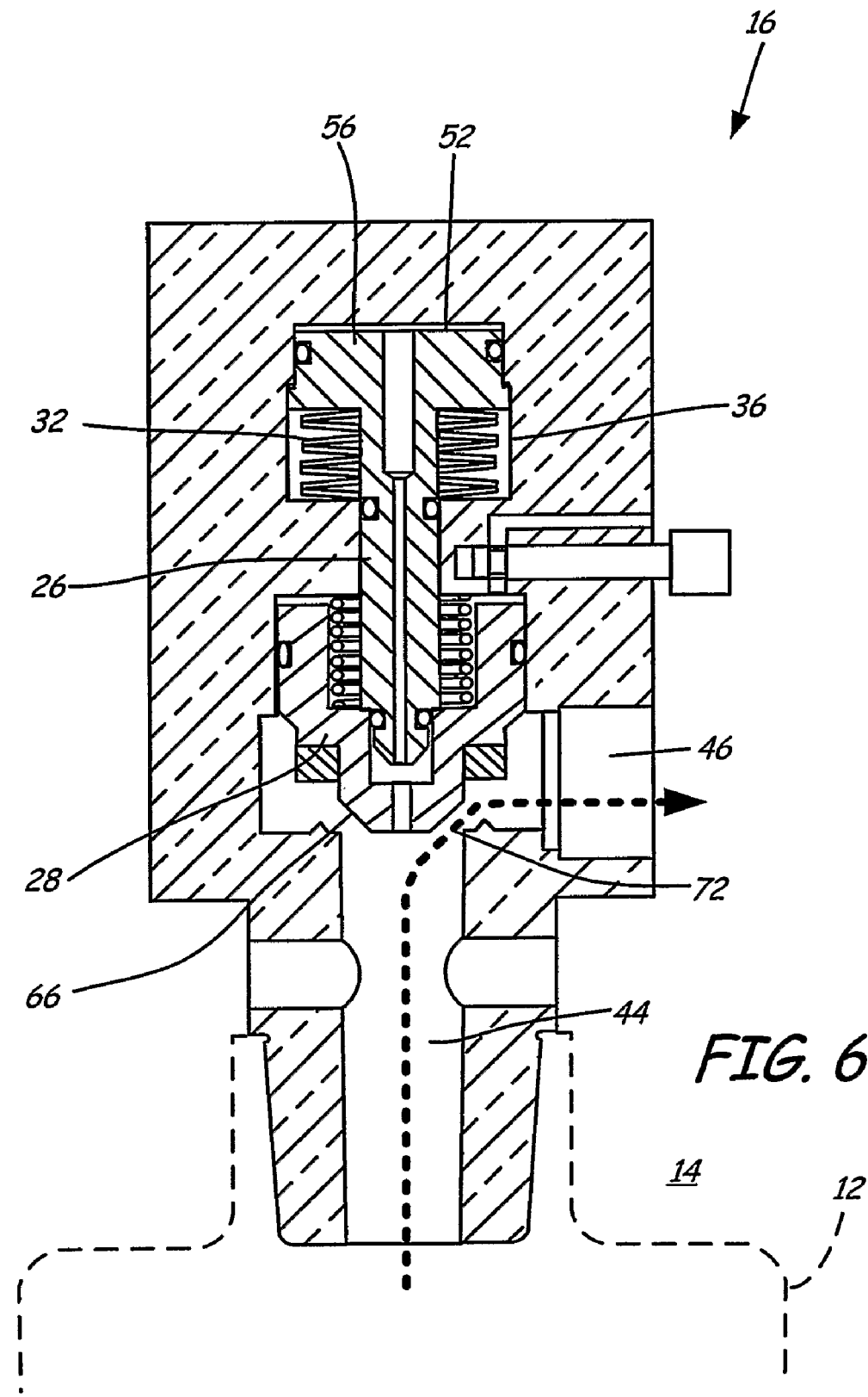
FIG. 6 is a sectional view of the fire suppression system in a fully open position in accordance with the present invention.

FIGS. 4-6 show sectional views of self-regulating valve 16 in a fully closed position, a partially open position, and a fully open position, respectively. FIG. 4 is a sectional view of self-regulating valve 16 in the fully closed position mounted on cylinder 12. When self-regulating valve 16 is in standby for fire protection, slidable spool 34 is powered off and bleed passage 48 is blocked so that gas cannot leave bias chamber 50. Gas from gas cylinder 12 flows through flow passage 76 such that gas cylinder 12, bias chamber 50 and control chamber 52 are filled with inert gas and have the same pressure. Due to the pressure applied on main section 64 of plug 28 from the gas in bias chamber 50 and hold down spring 30, control contour end 66 of plug 28 engages gas inlet 44 and seals primary passage 72 such that gas cannot pass through primary passage 72 to gas outlet 46. Additionally, passage 78 of slidable spool 34 is not aligned with bleed passage 48 such that gas cannot be expelled from bias chamber 50 to the atmosphere.

FIG. 5 is a sectional view of self-regulating valve 16 in a partially open position. When there is a need to discharge gas from cylinder 12, slidable spool 34 is moved to the open position such that passage 78 of slidable spool 34 is aligned with bleed passage 48 and gas is allowed to flow from bias chamber 50 through bleed passage 48. Slidable spool 34 is normally electrically activated by control panel 20 (shown in FIG. 1). In case of a power failure during a fire, self-regulating valve 16 can also be opened manually by activation device 80.

As gas flows from bias chamber 50 through bleed passage 48, the pneumatic pressure differential between gas cylinder 12 and bias chamber 50 move plug 28 up almost instantly to the partially open position. Plug 28 eventually stops when rod section 54 of piston 26 fully engages plug 28. When plug 28 is in the partially open position, control contour end 66 of plug 28 is disengaged from gas inlet 44, partially opening primary passage 72. Gas is thus able to pass through primary passage 72 from gas inlet 44 to gas outlet 46 and into protected room 14. The cross-section of primary passage 72 is directly correlated to the displacement of plug 28, and self-regulating valve 16 opens from a minimal to a maximal area as a function of the displacement of plug 28.

When plug 28 is in the partially open position, primary passage 72 is only partially open so that overpressure does not occur in protected room 14 due to a high initial discharge of gas. Gas continues to be discharged from flow control valve 16 at a controlled rate with primary passage 72 open only a certain percentage. When end portion 58 of rod section 54 of piston 26 engages plug 28, gas can no longer pass around end portion 58 of rod section 54 of piston 26 into bias chamber 50. O-ring 82 around end portion 58 of rod section 48 of piston 26 seals any passage into bias chamber 50 around piston 26 and ensures that gas does not enter bias chamber 50. Although gas cylinder 12 and bias chamber 50 are no longer in communication, gas cylinder 12 and control chamber 52 are still in communication through flow passage 76. As gas continues to flow into protected room 14, the pressures in gas cylinder 12 and control chamber 52 gradually decrease and piston 26 along with plug 28 begins to move to the open fully position.

FIG. 6 shows self-regulating valve 16 in a fully open position. Because gas cylinder 12 and control chamber 52 are in communication with each other, as gas is released into protected room 14, the pressures in gas cylinder 12 and control chamber 52 decrease at the same rate. Once the pressure in control chamber 52 has decayed to a predetermined level, the force of Belleville spring 32 begins to overcome the pressure exerted against head section 56 of piston 26 in control chamber 52. Piston 26 and plug 28 thus begin to move together to the open position due to the pressure exerted against control contour end 66 of plug 28 by the gas leaving gas cylinder 12 through gas inlet 44. As a result, primary passage 72 continues to open and the gas in gas cylinder 12 are released into protected room 14 at a relatively constant rate to ensure that the requisite amount of gas is discharged into protected room 14 within specified time limits and without causing overpressure in protected room 14. Self-regulating valve 16 is in the fully open position when head section 56 of piston 26 abuts piston chamber 42 of interior cavity 36 and primary passage 72 is fully open. The rate of gas release from self-regulating valve 16 is thus controlled by the pressure decay profile in gas cylinder 12 and by the contour of control contour end 66 of plug 28.

Figure 7:
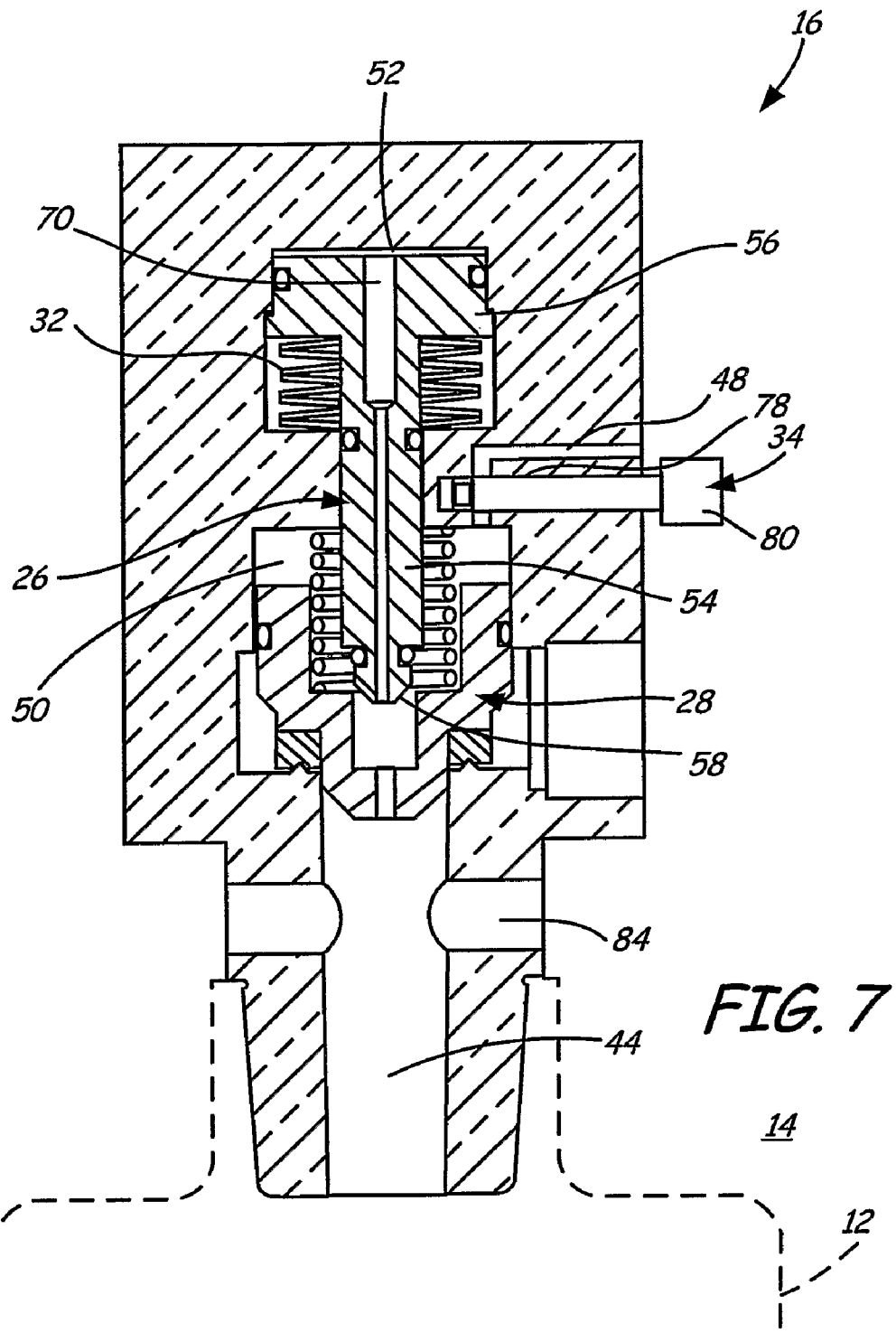
FIG. 7 is a sectional view of the fire suppression system in a recharging position in accordance with the present invention.

FIG. 7 shows self-regulating valve 16 after the gas in gas cylinder 12 has been discharged and self-regulating valve 16 needs to be recharged for subsequent use. Once most of the gas has been emitted from self-regulating valve 16, no more pressure is exerted against plug 28, thus spring 30 starts pushing plug 28 back to the closed position. With plug 28 in the closed position, control contour end 66 of plug 28 engages gas inlet 44 such that primary passage 72 (shown in FIGS. 5 and 6) is closed. Because there is no force acting on head section 56 of piston, the force of Belleville spring 32 maintains piston 26 in the open position. Plug 28 is thus disengaged from piston 26, allowing communication between gas cylinder 12 and bias chamber 50 around end portion 58 of rod section 54 of piston 26. Gas cylinder 12 is also in communication with control chamber 52 through flow passage 76. Slidable spool 34 is manually moved back to the closed position to ensure that as gas is passed into bias chamber 50, the gas will not leave self-regulating valve 16 through bleed passage 48.

After slidable spool 34 is moved to the closed position, gas is passed through charging port 84 into gas cylinder 12, bias chamber 50, and control chamber 52. As gas flows into control chamber 52 and begins to equalize throughout self-regulating valve 16, the pressure in control chamber 52 eventually overcomes the spring force of Belleville spring 32 and piston 26 moves to the closed position. When cylinder 12 is fully charged, gas cylinder 12, bias chamber 50, and control chamber 52 have equal pressures and piston 26, plug 28, and slidable spool 34 are in the closed position.

Figure 8:
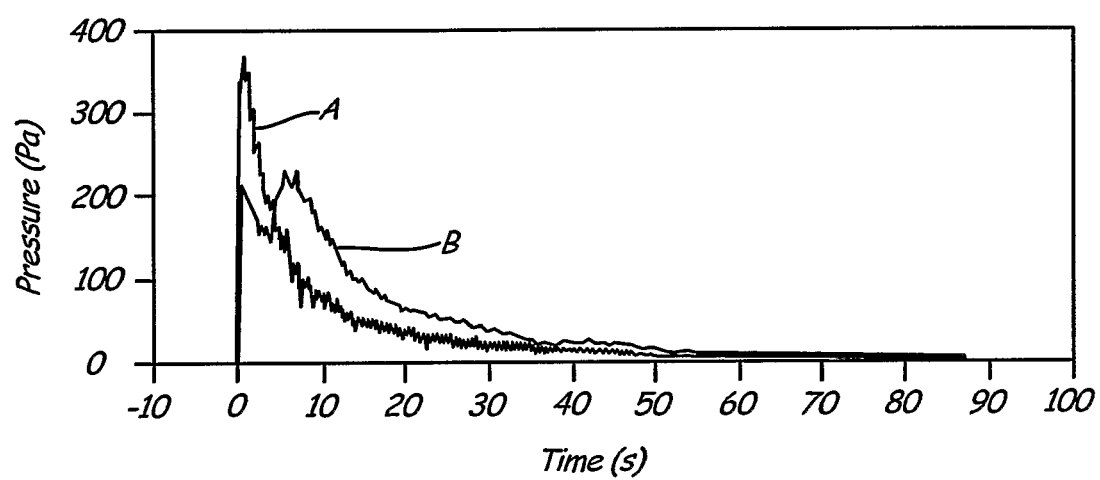
FIG. 8 is a graph of pressure in an enclosed room to be protected by the fire suppression system in accordance with the present invention as a function of time.

FIG. 8 is a graph of rate of release of gas A from a prior art flow control valve and rate of release of gas B from self-regulating valve 16. As can be seen in FIG. 6, prior art flow control valves release gas into an enclosed room at a dangerously high pressure in a very short period of time. This can pose a danger to any personnel and equipment in the enclosed room when the gas is released. By contrast, self-regulating valve 16 releases gas into the enclosed room at a controlled rate. The initial rate of release of gas gradually increases and generally levels off as self-regulating valve 16 opens. As the gas in self-regulating valve 16 is released and the level of gas remaining in self-regulating valve 16 decays, the gas pressures in cylinder 12, bias chamber 50, and control chamber 52 and the rate of gas release gradually decrease until there is a nominal amount of gas left in self-regulating valve 16 and no more gas is emitted.

The self-regulating valve of the present invention controllably releases inert gas from a gas cylinder into an enclosed space upon detection of a fire. The self-regulating valve has a piston and plug housed in the interior cavity of the valve body. The piston is slidable between a closed position and an open position. The plug is slidable between a closed position, a partially open position, and a fully open position. The piston and the interior cavity of the valve body form a bias chamber at one end of the interior cavity and a control chamber at the opposite end of the interior cavity. When the self-regulating valve is in standby mode, the gas cylinder, the bias chamber, and the control chamber are equally pressurized and both the piston and the plug are biased toward the closed position by the pressure applied to the piston in the control chamber and a plug spring.

When the plug is in the closed position, the plug engages a gas inlet such that a primary flow passage connecting the gas inlet and a gas outlet is fully closed. After a slidable spool is actuated, gas is allowed to bleed from the bias chamber to the atmosphere. As gas is released from the bias chamber, the pneumatic pressure differential between the bias chamber and the gas cylinder causes the plug to move almost instantaneously to the open position, stopping when it engages the piston. When the plug is in the partially open position, the primary passage is partially open. This allows gas to pass from the gas cylinder through the primary passage and into the enclosed room at a controlled rate.

After all the gas has been bled from the bias chamber, the pressures in the gas cylinder and the control chamber begin to equalize and decrease as the gas is released. At a predetermined level, the spring force of the spring positioned in the control chamber overcomes the pressure exerted against the piston in the control chamber and allows the piston and the plug to move to the fully open position. As the piston and the plug move to the fully open position, the primary passage increases in cross-sectional area, allowing a second burst of gas to be released from the self-regulating valve into the protected room. The competing forces of the springs, the contour of the plug, and the pneumatic pressures in the gas cylinder, the bias chamber, and the control chamber control the rate of movement of the plug and the rate of gas release into the enclosed room.

Although the present invention has been described with reference to preferred embodiments, workers skilled in the art will recognize that changes may be made in form and detail without departing from the spirit and scope of the invention.

The invention claimed is:

1. A two-step, self-regulating valve for controlling gas flow from a gas cylinder in high pressure systems, the valve comprising:
   a valve body;
   a piston movable within the valve body along an axis between a first and a second position;
   a plug movable within the valve body along the axis between a valve closed position, a partially open position, and a fully open position;
   a valve actuator that allows the plug to move from the valve closed position to the partially open position; and
   a piston actuator that causes the piston to move from the first position to the second position when a gas pressure in the gas cylinder is less than a setpoint to allow the plug to move from the partially open position to the fully open position.

2. The two-step, self-regulating valve of claim 1, wherein the valve body has an interior cavity, the interior cavity having a first end and a second end.

3. The two-step, self-regulating valve of claim 2, and further comprising a bias chamber located in the first end of the interior cavity and a control chamber located in the second end of the interior cavity.

4. The two-step, self-regulating valve of claim 3, and further comprising a flow passage connecting the gas cylinder, the bias chamber, and the control chamber.

5. The two-step, self-regulating valve of claim 4, and further comprising a bleed passage connected to the bias chamber, wherein the gas pressure is vented to the atmosphere through the bleed passage.

6. The two-step, self-regulating valve of claim 4, and further comprising a slidable spool engageable with the bleed passage and slidable between a closed position and an open position.

7. The two-step, self-regulating valve of claim 3, wherein the plug is urged towards the partially open position by a decreasing pneumatic pressure in at least one of the chambers.

8. The two-step, self-regulating valve of claim 3, wherein the piston actuator is a spring and wherein the piston is urged towards the second position by a decreasing pneumatic pressure in at least one of the chambers and the spring.

9. The two-step, self-regulating valve of claim 3, wherein the plug engages the piston when the plug is in the partially open position, and wherein the piston moves to the second position and the plug moves to the fully open position simultaneously as a function of a decreasing pneumatic pressure in the control chamber.

10. The two-step, self-regulating valve of claim 1, wherein a rate of gas release from the self-regulating valve is based on a contour of the plug.

11. An open loop pneumatic flow control valve for controlled gas pressure release from a gas cylinder in a protected room, the open loop pneumatic flow control valve comprising:
    a valve body;
    a piston movable between a first position and a second position within the valve body;
    a plug movable between a closed position, a partially open position, and a fully position within the valve body; and
    an activation device;
    wherein the plug moves from the closed position to the partially open position in response to activation of the activation device, and wherein the plug moves from the partially open position to the fully open position and the piston moves from the first position to the second position in response to a decreasing pressure in the gas cylinder.

12. The open loop pneumatic flow control valve of claim 11, and further comprising a bias chamber and a control chamber located within the valve body.

13. The open loop pneumatic flow control valve of claim 12, and further comprising a flow passage connecting the gas cylinder, the bias chamber, and the control chamber.

14. The open loop pneumatic flow control valve of claim 13, and further comprising a bleed passage for venting gas pressure from the bias chamber to the atmosphere.

15. The open loop pneumatic flow control valve of claim 14, wherein the plug is urged from the closed position to the partially open position by a decreasing pneumatic pressure in the bias chamber.

16. The open loop pneumatic flow control valve of claim 15, wherein the plug is urged from the partially open position to the fully open position and the piston is urged from the first position to the second position by a decreasing pneumatic pressure in the control chamber.

17. The open loop pneumatic flow control valve of claim 11, and further comprising a primary passage connecting the gas cylinder to the atmosphere, wherein the primary passage opens progressively from a minimal to a maximal area as the plug moves from the closed position to the partially open position and from the partially open position to the fully open position.

18. A method for automatically releasing gas from a gas container into a pipe in two phases, the method comprising:
    actuating an actuation device connected between a valve body and a bleed passage;

moving a plug from a closed position to a partially open position in response to a first pneumatic pressure differential between the valve body and the pipe; and urging a piston from a first position to a second position, and urging the plug from the partially open position to a fully open position in response to a second pneumatic pressure differential between the valve body and the gas container.

19. The method of claim 18, wherein urging the piston to the second position is further in response to a spring.

20. The method of claim 18, wherein the actuation device is a slidable spool.

21. The method of claim 18, wherein the actuation device is a Schraeder valve.

* * * * *